US009225004B2

(12) United States Patent
Yamazaki (10) Patent No.: US 9,225,004 B2
(45) Date of Patent: Dec. 29, 2015

(54) METHOD FOR PRODUCING ELECTRODE PLATE

(75) Inventor: Nobuyuki Yamazaki, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/823,393

(22) PCT Filed: Dec. 24, 2010

(86) PCT No.: PCT/JP2010/073282
§ 371 (c)(1),
(2), (4) Date: Mar. 14, 2013

(87) PCT Pub. No.: WO2012/086047
PCT Pub. Date: Jun. 28, 2012

(65) Prior Publication Data
US 2013/0260017 A1 Oct. 3, 2013

(51) Int. Cl.
| | | |
|---|---|---|
| B05D 5/12 | (2006.01) |
| H01M 4/04 | (2006.01) |
| B05D 1/28 | (2006.01) |
| B05C 1/08 | (2006.01) |
| H01M 4/139 | (2010.01) |
| B05C 11/02 | (2006.01) |

(52) U.S. Cl.
CPC ........... *H01M 4/0409* (2013.01); *B05C 1/0808* (2013.01); *B05D 1/28* (2013.01); *B05D 5/12* (2013.01); *H01M 4/0404* (2013.01); *H01M 4/139* (2013.01); *B05C 11/025* (2013.01); *Y02E 60/122* (2013.01)

(58) Field of Classification Search
USPC .......... 427/58, 98.4, 123, 355, 359, 367, 286, 427/428.06
See application file for complete search history.

(56) References Cited

U.S. PATENT DOCUMENTS

| | | | |
|---|---|---|---|
| 4,263,870 A * | 4/1981 | Saito et al. .................... 118/259 |
| 5,922,402 A * | 7/1999 | Speeney ..................... 427/208.6 |
| 6,045,947 A | 4/2000 | Shindo et al. |
| 7,790,218 B2 * | 9/2010 | Hayashi .......................... 427/58 |
| 8,039,044 B2 * | 10/2011 | Hayashi ......................... 427/123 |
| 8,361,554 B2 * | 1/2013 | Majima et al. ................ 427/359 |
| 2005/0109272 A1 | 5/2005 | Ooshima et al. |

(Continued)

FOREIGN PATENT DOCUMENTS

| | | |
|---|---|---|
| JP | 7-156525 | 6/1995 |
| JP | 2000-202358 | 7/2000 |

(Continued)

*Primary Examiner* — Brian K Talbot
(74) *Attorney, Agent, or Firm* — Finnegan, Henderson, Farabow, Garrett & Dunner, LLP (57) ABSTRACT

A coating device is arranged to a strip-shaped base sheet with coating material by holding the coating material on the surface of a coating rod and bringing the base sheet into contact with the coating material held on the coating rod, while conveying the base sheet in the longitudinal direction. The coating rod has a water-repellent section, in which the entire circumferential surface of a part of the rod in the axial direction is coated with a water-repellent material that repels the coating material, and a non-water-repellent section that is not coated with the water-repellent material and arranged adjacent to the water-repellent section. Consequently, even if the base sheet is brought into contact with the coating rod, the base sheet can be adequately provided with an uncoated portion in a part in the width direction since the coating material is repelled in the water-repellent section.

4 Claims, 7 Drawing Sheets

(56) References Cited

U.S. PATENT DOCUMENTS

| | | | |
|---|---|---|---|
| 2005/0221010 A1* | 10/2005 | Takahashi | 427/355 |
| 2006/0068166 A1* | 3/2006 | Takahashi | 428/141 |
| 2007/0141263 A1* | 6/2007 | Schaefer | 427/355 |
| 2007/0269600 A1 | 11/2007 | Gozdz et al. | |
| 2007/0281072 A1* | 12/2007 | O'Connor et al. | 427/2.1 |
| 2008/0276861 A1 | 11/2008 | Ooshima et al. | |
| 2010/0062146 A1 | 3/2010 | Hayashi et al. | |
| 2012/0183681 A1* | 7/2012 | Umebara | 427/113 |
| 2012/0318192 A1* | 12/2012 | Yamazaki | 118/200 |

FOREIGN PATENT DOCUMENTS

| | | |
|---|---|---|
| JP | 3553244 | 8/2004 |
| JP | 2005-111299 | 4/2005 |
| JP | 2005-131512 | 5/2005 |
| JP | 2008-166113 | 7/2008 |
| JP | 2009-247985 | 10/2009 |
| KR | 10-2009-0010083 | 1/2009 |

\* cited by examiner

METHOD FOR PRODUCING ELECTRODE PLATE

CROSS-REFERENCE TO RELATED APPLICATIONS

This application is a national phase application of International Application No. PCT/JP2010/073282, filed Dec. 24, 2010, the content of which is incorporated herein by reference.

TECHNICAL FIELD

The present invention relates to a coating device arranged to hold a coating material on a surface of a rod and bring a strip-shaped base sheet being conveyed into contact with the coating material held on the rod to apply the coating material to the base sheet, and a method for producing an electrode plate using the coating device. More specifically, the present invention relates to a coating device arranged to perform coating while leaving an uncoated section in an end portion of the base sheet in a width direction, and a method for producing an electrode plate using the coating device.

BACKGROUND ART

In producing a positive or negative electrode plate to be used in secondary batteries, there is conventionally adopted a method in which a coating material containing binder and electrode active material is applied to a metal foil and then dried (for example, see Patent Document 1). To shorten the total time needed for all steps of producing such electrode plate, it is desired to reduce the time needed for a drying step. However, when drying is performed at higher temperatures than in conventional methods, the binder contained in the coating material is apt to concentrate close to the surface of the coating material during drying. Accordingly, some portions may have low bonding strength between the base sheet and the coating material by the binder.

On the other hand, in another proposed technique, a coating material containing binder is first applied but not dried, and then a remaining material is applied thereto for recoating. It is found that this technique enables the binder to appropriately function even after dried at relatively high temperatures. As a device for applying a coating material containing binder, that is, a coating device for a first layer, a coating device including a rod-like coating member (a coating rod) is suitably used. The coating device provided with such a coating rod may include, e.g., a rod coater (only a rod, a rod provided with a wound wire, a rod formed with a groove or grooves, etc.) and a gravure coater. In those coating devices, usually, a coating rod is rotated while a part of the rod in its circumferential direction is being dipped in coating material, and the other part than the dipped part is brought into contact with a base sheet.

In producing an electrode plate, conventionally, coating is conducted, not over the entire surface of a metal foil, so that uncoated sections are left in end portions in its width direction. The uncoated sections left will be used as current collecting portions in a battery. The coating device is therefore configured to restrict adhesion so that the coating material does not adhere or stick to portions to be formed as the uncoated sections of the base sheet. For instance, outside portions other than a coating range of a coating rod would be covered with masking tapes to restrict a coating width. With this configuration, the ranges of the coating rod covered with the masking tapes do not contact with the base sheet.

RELATED ART DOCUMENTS

Patent Documents

Patent Document 1: JP-A-2008-166113

SUMMARY OF INVENTION

Problems to be Solved by the Invention

Figure 7:
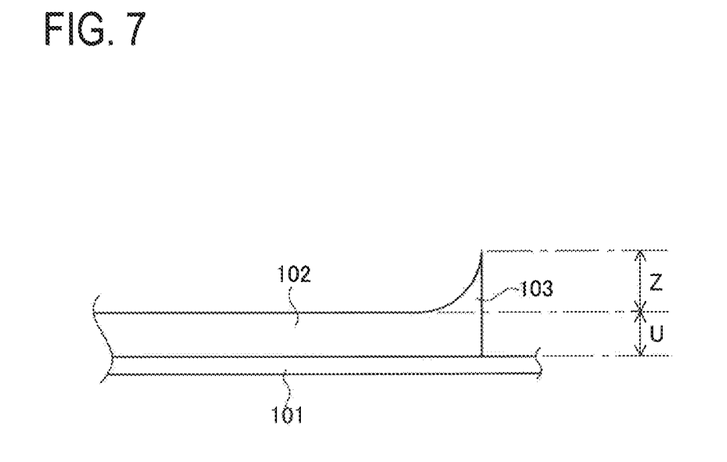
FIG. 7 is an explanatory view showing edge rising.

However, in the configuration using the masking tapes to restrict the coating range, for example, the following states may occur.
(1) When the position of the masking tape(s) is displaced after the tape(s) is stuck, a coating width is deviated from a target range.
(2) The coating material runs up onto the outer surface of the masking tape(s). This results in undulation in the end portions of the coating range.
(3) Even though the coating material does not run up as in (2), the coating material adhering to the coating rod creeps up along the end face of the masking tape by its own surface tension. Since the coating is performed in this state, a thicker coated portion than others occurs at the edge of a coated layer on the base sheet as shown in FIG. 7. This phenomenon is called edge rising. This figure is rather exaggerated for showing a state where an end portion of a coating material 102 applied on a base sheet 101 has an edge rising portion 103. As the creeping amount on the coating rod is larger, a difference in height between the edge rising portion 103 and the other portion with a coating thickness U (hereinafter, the difference is referred to as an edge rising amount Z) is greater.
(4) Due to dynamic frictional force between the base sheet and the masking tape, a conveying state of the base sheet is unstable.

In case the above states come about, the following defects occur. In the case of the state (1) or (2), the range of an uncoated section is not obtained as targeted. That is, it could not be said that the coating range is appropriately restricted. When the coated base sheet is wound, the positions of the edge rising portions as in (3) are piled up one on another. Thus, if the edge rising amount is too large, the winding operation may be hard or the base sheet may be broken. When coating is performed in the unstable conveying state as in (4), the coating thickness slightly differs from portion to portion of the base sheet, in the case where an active material layer is applied thereon, therefore, a bonding strength of the binder between the base sheet and the active material layer may vary by portion. This causes a problem with non-uniform peel strength of the active material layer with respect to the base sheet.

The present invention has been made to solve the above problems of the conventional coating device and has a purpose to provide a coating device for coating by making a coating rod into contact with a base sheet, the device being able to appropriately form an uncoated section in a part of the base sheet in its width direction and ensure uniform coating to a coated section, and a method for producing an electrode plate.

Means of Solving the Problems

To achieve the above purpose, one aspect of the invention provides a coating device arranged to hold coating material on a surface of a rod, and to bring a strip-shaped base sheet into contact with the coating material held on the rod while conveying the base sheet in a longitudinal direction, to apply the coating material to the base sheet, wherein the rod includes: a water repellent section in which water-repellent material that repels the coating material is coated on an entire circumferential surface of a part of the rod in an axial direction; and a non-water-repellent section arranged adjacent to the water repellent section and not coated with the water-repellent material.

According to the above coating device, the water repellent section of the coating rod is coated with the water-repellent material that repels the coating material. Thus, the coating material does not adhere to the water repellent section. Since the coating is performed using this coating rod, the coating material does not adhere to the range of the base sheet facing the water repellent section even when the base sheet and the coating rod are placed in contact with each other. Specifically, the range facing the water repellent section can be made as an uncoated section. Consequently, the coating device is able to coat the base sheet by the coating rod placed in contact with the base sheet and appropriately form the uncoated section in a part of the base sheet in the width direction.

In the above device, preferably, the non-water-repellent section is provided in one portion of the rod, and the water repellent section is provided on each of both adjacent sides of the non-water repellent section in the axial direction of the rod. With this configuration, uncoated sections can be formed appropriately on both side of a coated section.

In the above device, preferably, the water repellent section has a surface roughness having a maximum height in a range of $Ry \leq 1$ μm. With this configuration, dynamic frictional force between the water repellent section and the base sheet is low, so that the base sheet is conveyed stably. Thus, a coating condition to the coated section can be made uniform.

In the above device, further preferably, the rod includes a recess in the surface of the non-water-repellent section, and a step height between the surface of the water repellent section and a portion of the surface of the non-water-repellent section other than the recess is in a range of 1 μm to 100 μm. With this configuration, the coating material is allowed to easily adhere to the recess or recesses of the non-water-repellent section. As long as the degree of the step height of the water repellent section falls in this range, even if the coating material creeps up along the step height, a rising height does not become so high.

Another aspect of the invention provides a method for producing an electrode plate, the method including holding coating material on a surface of a rod, and bringing a strip-shaped base sheet into contact with the coating material held on the rod while conveying the base sheet in a longitudinal direction, to apply the coating material to the base sheet, wherein the method uses the rod including: a water repellent section in which water-repellent material that repels the coating material is coated on an entire circumference of a part of the rod in an axial direction; and a non-water-repellent section arranged adjacent to the water repellent section and not coated with the water-repellent material, and the coating material is water soluble and contains binder. According to the above aspect, the coating material does not adhere to the range of the base sheet facing the water repellent section. Thus, the electrode plate can be produced in which the coating material is appropriately coated in the range only facing the non-water-repellent section.

In the above producing method, preferably, the method uses the rod provided with the water repellent section extending to a more outside portion in the axial direction than a portion facing an end portion of the base sheet in a width direction to form an uncoated section applied with no coating material on each end portion of the base sheet in the width direction. According this method, it is possible to produce the electrode plate steadily formed with the uncoated section extending to each edge of the base sheet in the width direction.

Effects of the Invention

According to the coating device and the method for producing an electrode plate in the above configurations of the invention, arranged to perform coating by bringing a coating rod in contact with a base sheet, it is possible to appropriately form an uncoated section in a part of the base sheet in its width direction and ensure uniform coating to a coated section.

MODE FOR CARRYING OUT THE INVENTION

A detailed description of a preferred embodiment of the present invention will now be given referring to the accompanying drawings. In the present embodiment, the invention is applied to a method for producing a lithium ion secondary battery and a coating device to be used in this producing method.

The lithium ion secondary battery producing method of the present embodiment is schematically performed by the following steps:

(1) An electrode active material layer is formed on a metal foil, thereby producing each of positive and negative electrode plates;
(2) The electrode plates produced in (1) and separators are overlapped and wound together to produce a wound body;
(3) The wound body is connected to positive and negative electrode terminals;
(4) The wound body is inserted in a battery case and then an electrolyte is poured into the battery case; and
(5) A liquid inlet is covered to seal the battery case.

The present invention is characterized in the electrode plate producing process in the step (1). The other steps (2) to (5) are all the same as those in a conventional art and thus will not be explained hereinafter. The electrode plate producing process in the step (1) of the present embodiment is a process to form an active material layer on a metal foil which will serve as a current collector sheet of the electrode plate. In this embodiment, the coating material to form the active material layer consists of a first coating material mainly containing a binder and a second coating material containing other materials than the binder. The coating device of the present embodiment is to be used to coat the first coating material on the metal foil which is a base sheet. In the step (1), a coating treatment using the coating device of the present embodiment is followed by a coating treatment of a second coating material using another coating device. The coating treatment of the second coating material is the same as in the conventional art.

Figure 1:
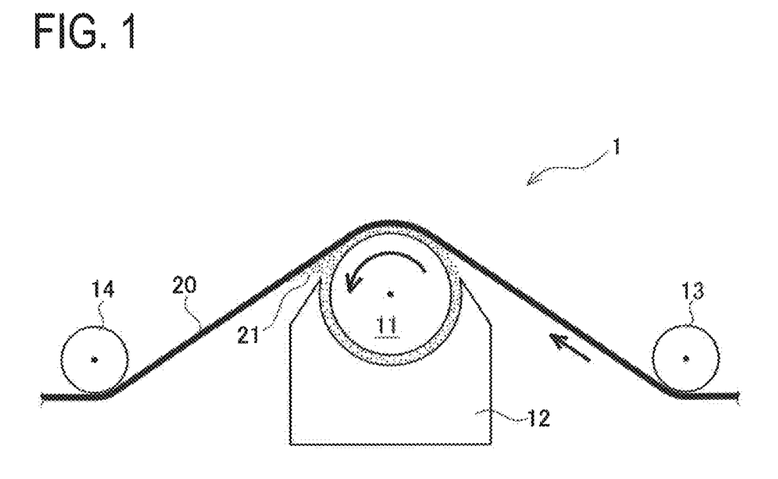
FIG. 1 is a schematic configuration view showing a coating device of a present embodiment.

A coating device 1 of the present embodiment includes, as shown in FIG. 1, a coating rod 11, a liquid pan 12, and near rolls 13 and 14. This coating device 1 is configured to apply a coating material 21 to a strip-shaped base sheet 20. The coating rod 11 is placed in such a position as to be partly dipped in the liquid pan 12. The space between the liquid pan 12 and the coating rod 11 is filled with the coating material 21. Two near rolls 13 and 14 are arranged in positions on both sides of the coating rod 11 in an advancing direction of the base sheet 20 and in parallel to the coating rod 11.

Figure 2:
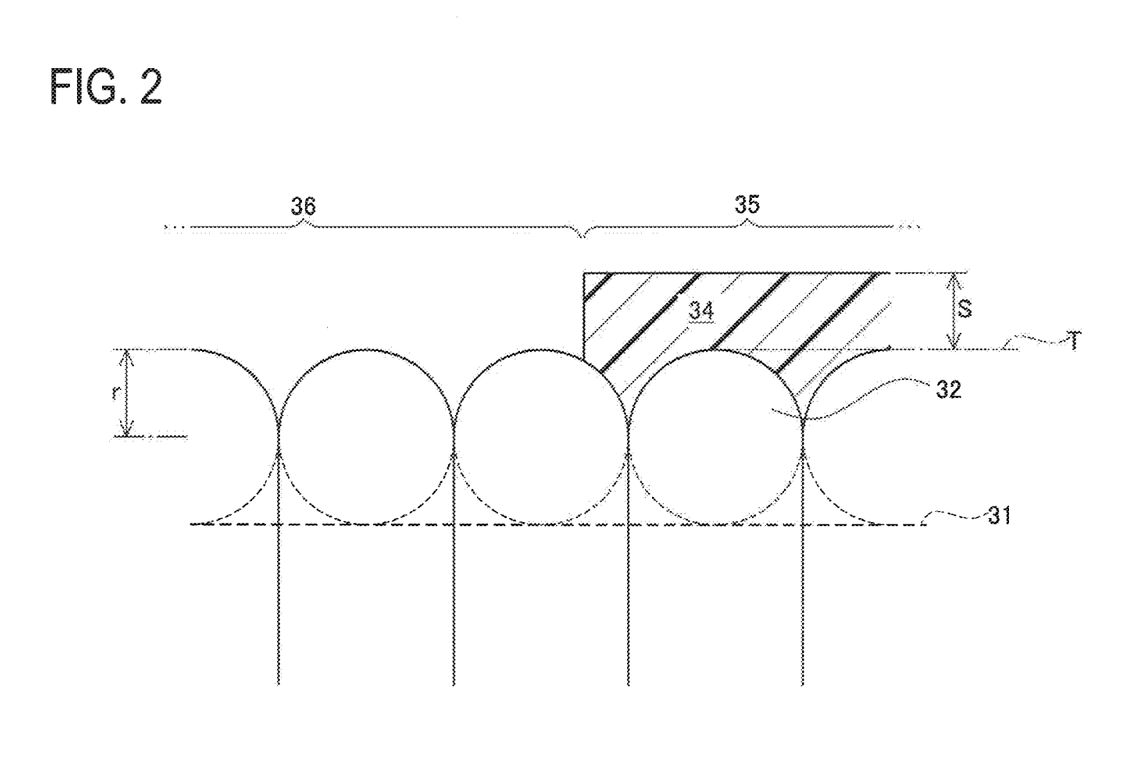
FIG. 2 is an explanatory view showing an enlarged diagram of a part of a coating rod.

The coating rod 11 of the present embodiment is formed of a rod 31 and a wire 32 tightly wound on the surface of the rod 31 as shown in FIG. 2. This type of coating rod is called a wire bar. This figure shows an enlarged view of a small portion of the rod 11 near its upper side when viewed in the axial direction being left to right.

A part of the coating rod 11 in the axial direction in the present embodiment is provided as a water repellent section 35 formed with a water-repellent material layer 34 on the surface as shown in FIG. 2. The water repellent section 35 corresponds to a range of the coating rod 11 in the axial direction in which the water-repellent material layer 34 is formed to prevent adhesion of the coating material 21. A portion adjacent on a left side to the water repellent section 35 in the figure is not formed with the water-repellent material layer 34 so that the wire 32 is exposed. The range in which the wire 32 is exposed corresponds to a non-water-repellent section 36. The arrangement of the water repellent section 35 and the non-water-repellent section 36 in the axial direction will be described later.

The water-repellent material layer 34 is a layer made of a water-repellent material coated on the surface of the water repellent section 35 as shown in FIG. 2. In the present embodiment, a water-soluble material is used as the coating material 21. Thus, a water-repellent material is used as a material of the water-repellent material layer 34. In the water repellent section 35, the water-repellent material layer 34 is formed on the entire surface of the coating rod 11 in a circumferential direction. In this figure, the water-repellent material layer 34 is illustrated in a sectional view. As the water-repellent material, preferably, a material having a contact angle of 90° or more to water is used. For example, there are appropriately water-repellent materials such as fluorine resin and general water-repellent materials such as silicone and carbon.

The water-repellent material layer 34 is provided, as shown in FIG. 2, with a height equal to or more than at least a vertex level T of the wire 32 in the radial direction of the coating rod 11. In the present embodiment, furthermore, the surface of the water-repellent material layer 34 is formed as a smooth cylindrical surface. Thus, a step height S between the surface of the water-repellent material layer 34 and the vertex level T of the wire 32 is uniform over the entire circumference of the coating rod 11.

The coating rod 11 in the present embodiment is configured to make the non-water-repellent section 36 hold the coating material 21 and apply the coating material 21 to the base sheet 20. For example, a suitable one as the coating rod 11 in the present embodiment is a rod 31 having a diameter of 10 mm on which a wire 32 having a diameter of 20 to 200 μm is wound. The step height S of the water-repellent material layer 34 is preferably determined to fall within a range of 1 to 100 μm. This is because the step height S of the water-repellent material layer 34 is preferably larger than the thickness of the coating material 21 to be adhered to the base sheet 20. If the step height S of the water-repellent material layer 34 is too large, the base sheet 20 could not properly contact with the coating material 21 held on the non-water repellent section 36. In the present embodiment, furthermore, the surface of the water-repellent material layer 34 is preferably formed with a surface roughness having a maximum height in a range of $Ry \leq 0.1$ μm. Excessive surface roughness causes large dynamic friction with the base sheet 20, which may lead to an unstable conveying state of the base sheet 20.

Figure 3:
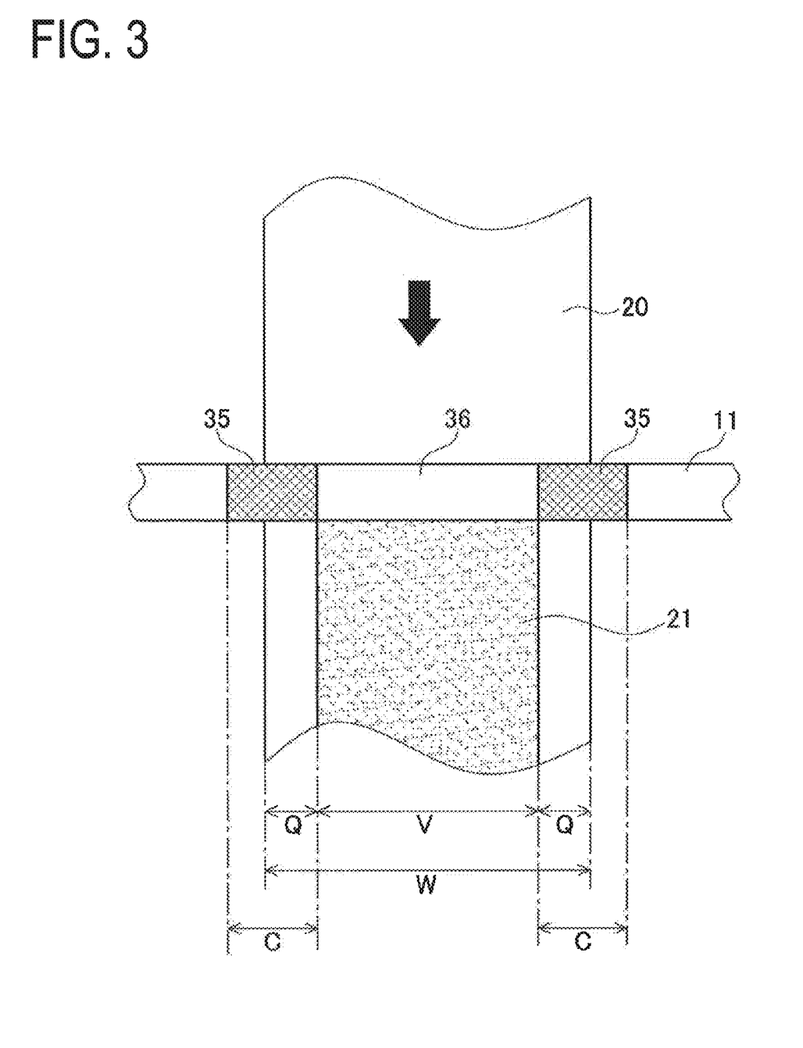
FIG. 3 is an explanatory view showing a coating range.

The coating device 1 in the present embodiment is a device arranged to leave uncoated sections Q in end portions on both sides of the base sheet 20 in the width direction and coat a range between the uncoated sections Q located on both sides to form a coated section V, as shown in FIG. 3. This figure schematically shows the range of the base sheet 20 being conveyed from above in the figure to be coated with the coating material 21 by passing across a part of the coating rod 11.

Each of the water repellent sections 35 of the coating rod 11 is provided in a range C including an entire range of the coating rod 11 facing the uncoated section Q and covering a slightly more outside than the width W of the base sheet 20 in the axial direction as shown in FIG. 3. The water repellent sections 35 in the present embodiment are provided at two positions in the axial direction of the coating rod 11. The range between the water repellent sections 35 of the coating rod 11 corresponds to the non-water-repellent section 36. That is, the non-water-repellent section 36 is not formed with the water-repellent material layer 34. The non-water-repellent section 36 is a range facing the coated section V within the width W of the base sheet 20. In other words, the water repellent sections 35 in the present embodiment are arranged adjacent to and on both sides of the non-water-repellent section 36 in the axial direction of the coating rod 11.

The coating rod 11 in the present embodiment is provided with the wire 32 over the entire non-water-repellent section 36 in the axial direction. More preferably, the wire 32 is wound over a wider range than the width W of the base sheet 20. Accordingly, as shown in FIG. 2, in at least an adjacent portion of the water repellent section 35 to the non-water-repellent section 36, the water-repellent material layer 34 is formed to overlap the wire 32.

However, portions more outside than the non-water-repellent section 36 in the axial direction do not necessarily have to be provided with the wire 32. In the portions not provided with the wire 32, the water-repellent material layer 34 is directly formed on the rod 31. In this case, the water-repellent material layer 34 in the relevant portion has a thickness corresponding to the sum of the diameter $2r$ of the wire 32 and the step height S.

Next, an explanation will be given to the treatment to apply the coating material 21 containing the binder to the base sheet 20 made of a metal foil by using the coating device 1 in the present embodiment. This coating material 21 is water soluble. In the coating treatment, as shown in FIG. 1, the base sheet 20 is conveyed by winding over the near rolls 13 and 14 to be pressed against the coating rod 11. The coating rod 11 receives rotary drive from a drive source so that a contact portion of the rod 11 moves in the same direction as an advancing direction of the base sheet 20, as indicated by an arrow in the figure. Accordingly, a portion of the coating rod 11 located in an upper side in the figure comes into contact with the base sheet 20.

Figure 4:
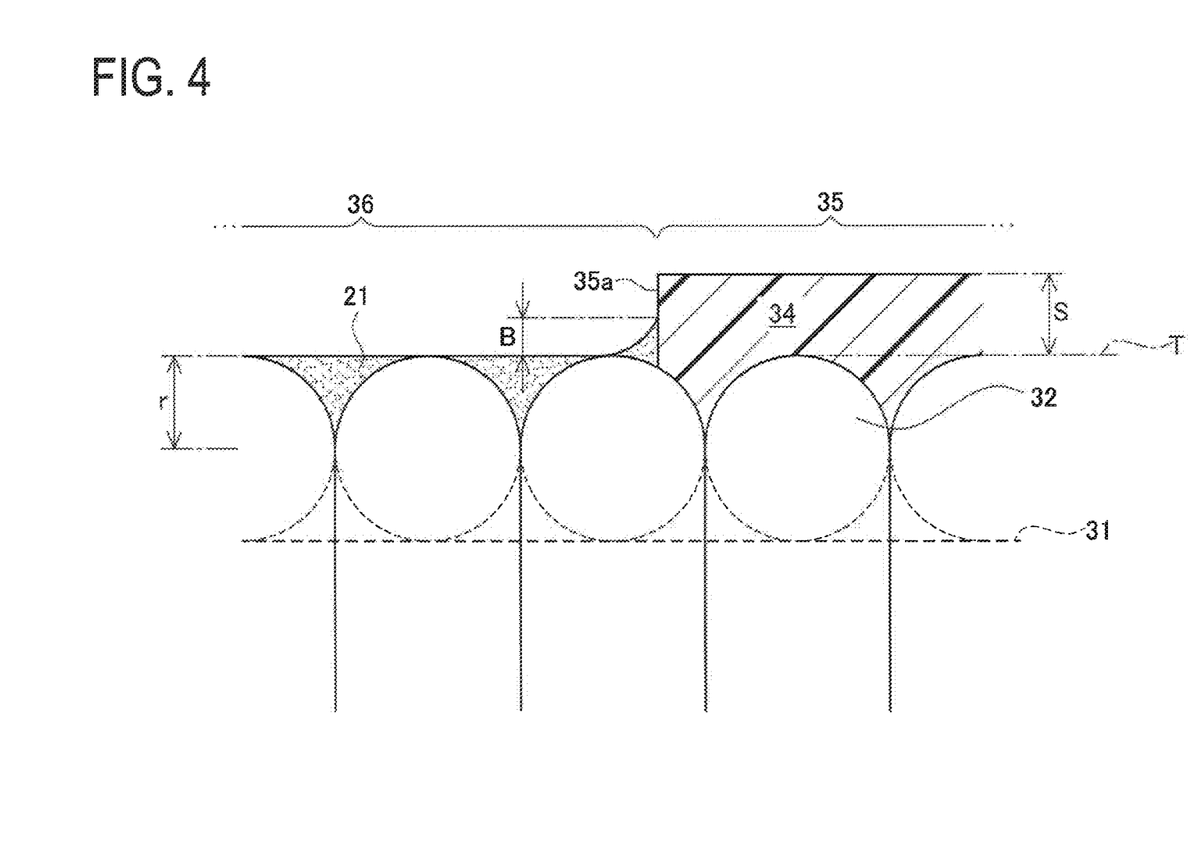
FIG. 4 is an explanatory view showing an enlarged diagram of a part of the coating rod to which a coating material adheres.

In the coating treatment, as shown in FIG. 4, the coating material 21 is held in a gap between the adjacent portions of the wire 32 in the non-water-repellent section 36. The coating material 21 is held in the range indicated with dot hatching in the figure. The cross sectional area of this range in the figure depends on the diameter of the rod 31 and the radius r of the wire 32. As an amount of the coating material 21 held on the coating rod 11 is larger, an amount of the coating material 21 to be applied to the base sheet 20 is larger. The larger the amount of the coated coating material 21, the thicker the coating thickness U of the coating material 21 after dried. Consequently, by determining the radius r of the wire 32, it is possible to select the coating thickness U of the coating material 21 to be applied to the base sheet 20. In general, as the radius r of the wire 32 is larger, the coating thickness U is thicker.

On the other hand, each water repellent section 35 is formed, on its surface, with the water-repellent material layer 34 as shown in FIG. 4. This water-repellent material layer 34 is made of a material that repels the coating material 21 as mentioned above. Thus, the coating material 21 does not adhere to the surface of the water repellent section 35. Even if the coating material 21 adheres thereto, the coating material 21 will fall off before it reaches a position where it may contact with the base sheet 20. Accordingly, the coating material 21 is less liable to enter the range of each water repellent section 35. Once formed, the water repellent sections 35 are less likely to be displaced, differently from a masking tape. According to the present embodiment, therefore, the width of the coated section V is stable and fixed.

In the present embodiment, the coating material 21 also somewhat creeps up along the wall surface 35a of the water repellent section 35 near the wall surface 35a as shown in FIG. 4. Thus, even in the coating device 1 of the present embodiment, the edge rising phenomenon slightly occurs in both end portions of the completed coated section V. The larger the creeping amount B on the coating rod 11, the higher the edge rising amount Z of the raised edge formed in the coated section V. However, the creeping amount B is smaller than that in the conventional art and thus there is no possibility that the coating material 21 runs up onto the water repellent section 35. This is because the water-repellent material layer 34 is water repellent.

Figure 5:
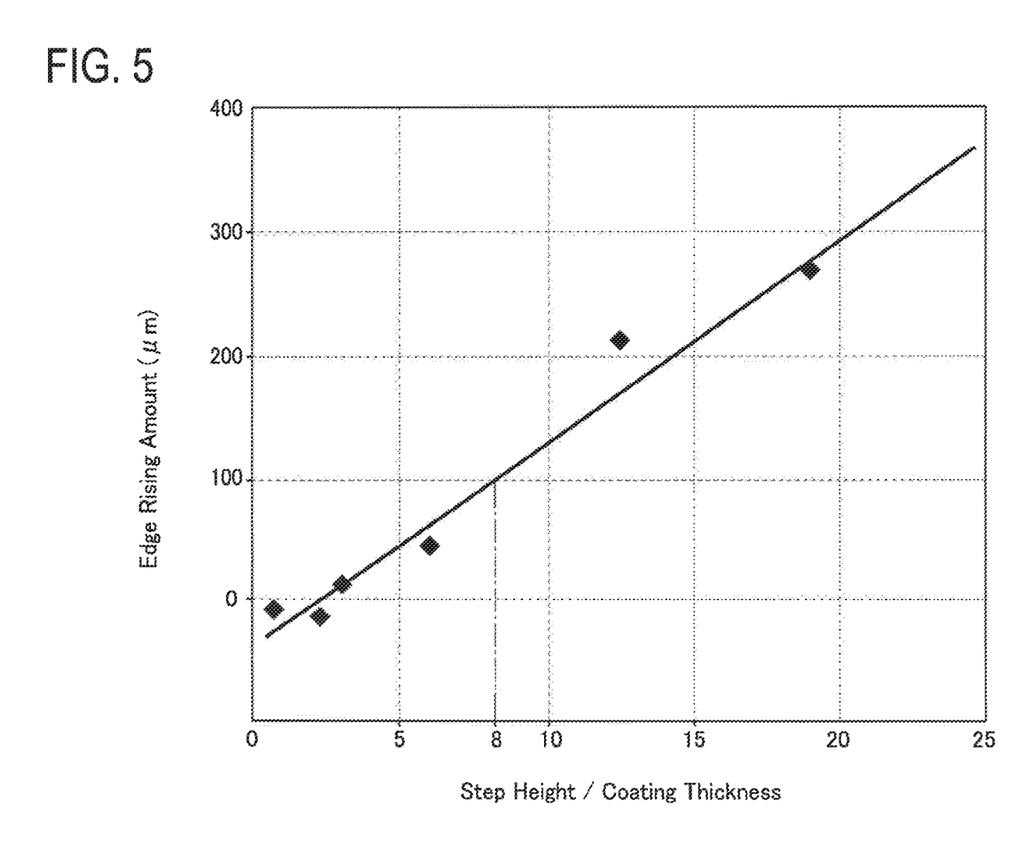
FIG. 5 is a graph showing a relationship between a ratio of step-height to coating-thickness and an edge rising amount.

The inventors found that the ratio R of the step height S of the water-repellent material layer 34 to the coating thickness U of the coating material 21 is related to the edge rising amount Z of the coated section V. The coating thickness U of the coating material 21 means an average thickness of a portion other than the edge rising portions of the coating material 21 formed in the coated section V of the coated base sheet 20 (see FIG. 7). The relationship of the edge rising amount Z to the ratio R (R=S/U) between the step height S and the coating thickness U in the coating device 1 of the present embodiment is obtained as shown in HG 5. Specifically, as the ratio R is higher, the edge rising amount Z is larger. Accordingly, an appropriate range of the step height S to restrict the edge rising amount Z within a permissible range is determined based on the relationship with the coating thickness U of the coating material 21 on the base sheet 20.

The permissible range of the edge rising amount Z depends on the property, size, and others of a product to be produced. For instance, in the case where the coating device 1 of the present invention is used as a part of an apparatus for producing an electrode plate, it is preferable that the edge rising amount Z is equal to or less than 400 μm, more preferably, equal to or less than 100 μm. Accordingly, from FIG. 5, the ratio of the step height S to the coating thickness U is preferably equal to or less than 25 and more preferably equal to or less than 8. In the case where the step height S is set to a thickness two or three times as great as the coating thickness U, the edge rising amount Z is a negative value. Specifically, the edges of the coated section V are not raised, but are rather lower than other portions. In this case the edges are low, its permissible range depends on products.

According to the coating rod 11 in the present embodiment, the water-repellent material is coated in the water repellent sections 35 each having the range C shown in FIG. 3, forming the water-repellent material layers 34. Thus, there is no possibility that the coating material 21 is coated in portions that should form the uncoated sections Q of the base sheet 20. On the other hand, the non-water-repellent section 36 facing the coated section V can hold the coating material 21 as shown in FIG. 4. Therefore, one surface of the base sheet 20 is coated with the coating material 21 in a range corresponding to the center coated section V, while both end portions in the width direction are left as the uncoated sections Q.

Furthermore, the water repellent sections 35 in the present embodiment are formed so that the ratio R of the step height S of the water-repellent material layer 34 to the coating thickness U is equal to or less than 25. Accordingly, the edge rising amount Z of each edge formed in the coated section V is equal to or less than 400 μm. As long as the edge rising amount Z is within this range, the base sheet 20 is less likely to be adversely affected even when this coated base sheet 20 is wound. Furthermore, when the water-repellent material layer 34 is formed so that the ratio R of the step height S to the coating thickness U is equal to or less than 8, the coating process can be performed so that the edge rising amount Z be equal to or less than 100 μm.

Figure 6:
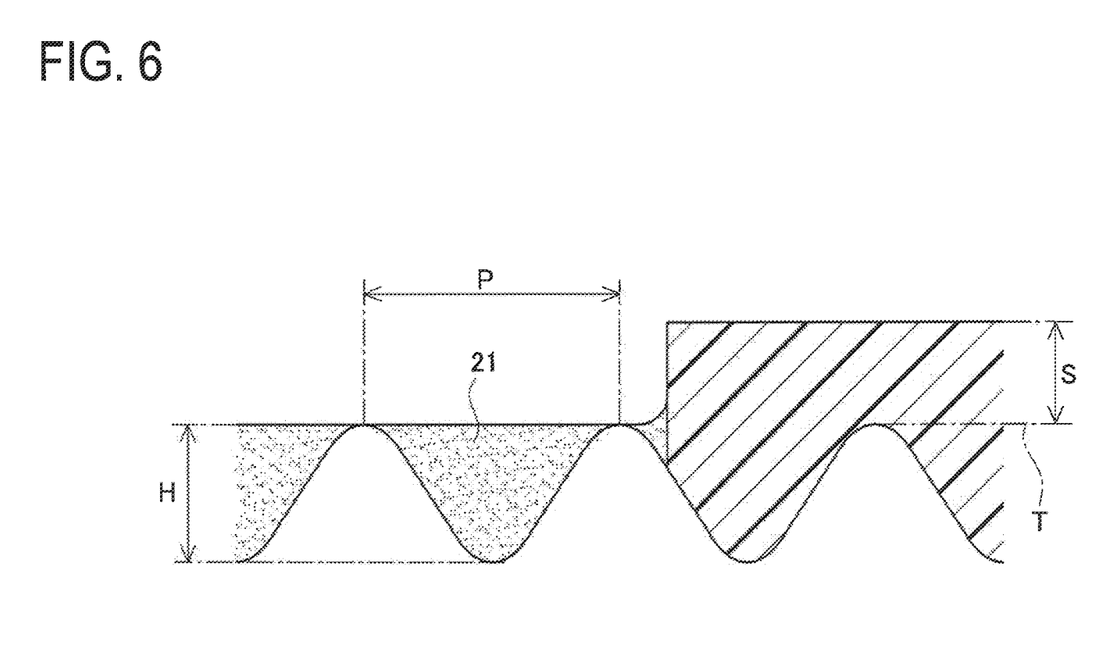
FIG. 6 is an explanatory view showing another example of the coating rod.

As the coating rod 11, there are preferably available not only the wire bar but also a rod having a surface formed with a groove(s), a rod having a smooth surface with no wire or groove, a gravure roll to be used for gravure coating, and others. Of them, the rod having a surface formed with grooves is shown in FIG. 6 illustrating a cross section of the grooves. In this illustrated example, corrugated grooves are tightly arranged. These grooves may be formed of circumferential grooves independent from each other or a single groove spirally continuous in a circumferential direction.

In the example shown in FIG. 6, the coating thickness U is determined according to selection of pitch P, depth H, and others of the grooves. In the case where the groove pitch P is constant, the deeper the depth H, the thicker the coating thickness U. In some grooves having different cross sectional shapes, other parameters further influence the coating thickness U. An electrode plate producing device preferably uses a 10-mm-diameter rod formed with grooves at a pitch P between 1 μm and 1000 μm inclusive and at a depth H between 1 μm and 100 μm inclusive. In the rod having a groove or grooves on the outer periphery, the step height S is the thickness of a water-repellent material layer located more radially outside than the level T of a portion formed with no groove(s).

Meanwhile, in addition to the displacement of the coating range and the edge rising, there is a conventional problem with variations in peel strength. This is caused by dynamic friction between the masking tape and the base sheet, resulting in an unstable conveying condition of the base sheet. In the present embodiment, therefore, the surface shape of each water repellent section 35 is determined so that dynamic friction between each water repellent section 35 and the base sheet 20 is minimal. In the present embodiment, specifically, the surface of each water repellent section 35 is formed with a surface roughness determined so that a maximum height is in a range of Ry≤0.1 μm. For instance, the surface of each water repellent section 35 is made very smooth by grinding or the like after coating. According to the coating device 1 of the present embodiment, therefore, the conveying state of the base sheet 20 is maintained stable.

For verification of this respect, the inventors produced an electrode plate of a preferred example by applying the coating device 1 of the present embodiment to a part of a process of producing a negative electrode plate. The inventors compared the degree of variations in peel strength of an active material layer between the electrode plate of the example and an electrode plate produced by the conventional producing method. As long as the conveying state is stable, the variations in peel strength of the active material layer are reduced.

Specifically, the inventors applied a binder layer onto a copper foil by the coating device 1, and then further applied a negative active material layer thereon by another coating device. Thereafter, the coating material was dried. The electrode plate of the example was thus completed. On the other hand, as a comparative example, the inventors produced the electrode plate of the comparative example by use of a coating device using a coating rod provided with no water repellent section 35. In the comparative example, specifically, the inventors applied a binder by the coating device with the coating rod whose ends portions were restricted with masking tapes, as conventionally performed. Other factors of the producing method in the comparative example excepting above are the same manners as those in the preferred example.

Experimental conditions of the example and the comparative example produced in this experiment are as below.

Common Condition:
Thickness of a coating liquid for the binder layer: 4 μm
Speed of coating the binder layer: 30 m/min
Drying after coating of the negative active material layer: 1 zone at 160° C.

The coating device for the negative active material layer is shared between the example and the comparative example.

The coating device for the binder layer in the example includes the coating rod 11 formed with the water repellent sections 35. The range of each water repellent section 35 is set to extend from either end of the coated section V to a position outside by 10 mm from either edge of the base sheet 20.

Water-repellent material: Fluorine resin
Step height: 10 μm (Ratio R=2.5)
Surface roughness of water repellent section: Ry≤0.1 μm The coating device for the binder layer in the comparative example includes the coating rod formed with no water repellent section. An area covered with the masking tape is from either end of the coated section V to a position inside by 10 mm from either edge of the base sheet 20.

Masking tape material: Fluorine resin
Masking tape thickness: 50 μm

The inventors measured the peel strength between the active material layer and the base sheet of the electrode plates produced in the example and the comparative example. The experiment was performed on 200 sampled sites. The test conditions are as below Peel strength test device: TACKING TESTER Model TAC II (manufactured by RHESCA Corporation)
Advancing speed: 30 mm/min
Separating speed: 30 mm/min
Pressurizing force: 4 N
Pressurizing time 10 seconds A maximum tensile stress during separating is assumed as the peel strength. Results of the experiment are shown in the following Table 1.

TABLE 1

| Peel Strength | Average (N/m) | Variations (N/m) |
|---|---|---|
| Example | 1.70 | 0.10 |
| Comparative Example | 1.65 | 0.55 |

As shown in Table 1, the averages of the peel strength are little different between the example and the comparative example. However, the variations in peel strength value are remarkably different between the example and the comparative example. Specifically, according to the coating device 1 of the present embodiment, it is found that an active material layer with less variation in peel strength was formed. In the comparative example, specifically, some portions are easy to peel or separate. In the example, such a portion is not found. This is because the surfaces of the water repellent sections 35 formed to be very smooth ensure a stable conveying state of the base sheet 20.

According to the coating device 1 of the present embodiment explained in detail above, the coating rod 11 is formed with the water repellent sections 35. Thus, the coating material 21 adhering to the ranges of the water repellent sections 35 will drop off from portions of the coating rod 11 not dipped in the liquid pan 12. At the time when contacts with the base sheet 20, the coating material 21 is adhering to only the range of the rod 11 facing the coated section V. Of the coating rod 11, the portions facing the uncoated sections Q are not adhered with the coating material 21. Therefore, when the coating rod 11 is placed in contact with the base sheet 20, only the range of the coated section V is coated.

Furthermore, the step height S of each water repellent section 35 is set to be equal to or less than a height twenty-five times as high as the coating thickness U of the coating material 21. Accordingly, the creeping amount B of the coating material 21 on the wall surface 35a of each water repellent section 35 falls within a permissible range. Thus, the edge rising amount Z of each edge rising portion formed in the coated section V also falls within a permissible range.

Furthermore, the surface of each water repellent section 35 is very smooth and thus the dynamic friction between the water repellent sections 35 and the base sheet 20 is small. This allows the base sheet 20 to be conveyed in a stable state. Accordingly, a uniform coating state is maintained. In the present embodiment, specifically, the coating device 1 is configured to bring the coating rod 11 into contact with the base sheet 20 to coat the base sheet 20, thereby appropriately forming the uncoated sections Q in the end portions of the base sheet 20 in the width direction and uniformly coating the coated section V. Consequently, when a battery is manufactured to include the electrode plate produced by use of the coating device 1 of the present embodiment, the manufactured battery can provide excellent performance.

The above embodiment is a mere example and does not impart any limitation to the present invention. Thus, the present invention may be embodied in other specific forms without departing from the essential characteristics thereof. For instance, the above embodiment shows the device for producing the electrode plate formed with the uncoated sections on both sides of the base sheet in the width direction. However, the uncoated sections on both sides do not always need to be equal in width to each other. The uncoated sections may be formed with different widths on both sides in the width direction or only one uncoated section may be formed on either one side in the width direction. The present invention is also applicable to a coating device arranged to produce an electrode plate formed with an uncoated section(s)

between coated sections in addition to the uncoated sections on both sides. This configuration can provide the same effects as above as long as the water repellent sections are appropriately formed in the ranges each facing an area of an uncoated section of a base sheet.

REFERENCE SIGNS LIST

1 Coating device
11 Coating rod
20 Base sheet
21 Coating material
34 Water-repellent material layer
35 Water repellent section
36 Non-water-repellent section

The invention claimed is:

1. A method for producing an electrode plate, the method using a rod and a liquid pan and including driving the rod to rotate while bringing the rod into partial contact with coating material filled between the rod and the liquid pan to hold the coating material on a surface of the rod, and bringing a strip-shaped base sheet into contact with the coating material held on the rod while conveying the base sheet in a longitudinal direction, to apply the coating material to a coated section of the base sheet by leaving an uncoated section in a width direction,
wherein the method uses the rod including:
a plurality of recesses formed on the surface and spaced from each other along a longitudinal direction of the rod;
a water repellent section in which water-repellent material that repels the coating material is coated on an entire circumference of a part of the rod in an axial direction overlapping at least one of the recesses; and
a non-water-repellent section including an uncoated section of at least one the recesses and arranged adjacent to the water repellent section and not coated with the water-repellent material, and
the non-water repellent section is placed to face the coated section, and the coating material is water soluble and contains binder.

2. The method for producing an electrode plate according to claim 1, wherein the method uses the rod provided with the water repellent section extending to a more outside portion in the axial direction than a portion facing an end portion of the base sheet in a width direction to form an uncoated section applied with no coating material on each end portion of the base sheet in the width direction.

3. The method according to claim 1, wherein the rod is a wire-wrapped rod, and the plurality of recesses are formed between wires.

4. The method according to claim 1, wherein the rod includes a plurality of grooves defining the plurality of recesses or a single spiral groove defining the plurality of recesses.

* * * * *